United States Patent [19]

Witte et al.

[11] Patent Number: 4,491,942

[45] Date of Patent: Jan. 1, 1985

[54] CIRCUIT FOR RECOGNIZING DATA COLLISIONS IN AN OPTICAL DATA BUS AND CIRCUIT FOR RECOGNIZING THE DATA-FREE STATUS OF THE BUS

[75] Inventors: Hans-Hermann Witte; Steven Moustakas, both of Munich, Fed. Rep. of Germany

[73] Assignee: Siemens Aktiengesellschaft, Berlin & Munich, Fed. Rep. of Germany

[21] Appl. No.: 505,432

[22] Filed: Jun. 16, 1983

[30] Foreign Application Priority Data

Jul. 1, 1982 [DE] Fed. Rep. of Germany ....... 3224664

[51] Int. Cl.³ .............................................. H04B 9/00
[52] U.S. Cl. .............................. 370/4; 370/94; 455/612
[58] Field of Search ............... 455/612, 606, 607, 608; 370/4, 84, 85, 94

[56] References Cited

U.S. PATENT DOCUMENTS 4,063,220 12/1977 Metcalfe et al. ...................... 370/93

OTHER PUBLICATIONS

"Ethernet: Distributed Packet Switching for Local Computer Networks" by Metcalfe et al., ACM, Jul. 1976, vol. 19, No. 7, pp. 395-404.

Primary Examiner—Joseph A. Orsino, Jr.
Assistant Examiner—Timothy K. Greer
Attorney, Agent, or Firm—Hill, Van Santen, Steadman & Simpson

[57] ABSTRACT

If data from more than one subscriber circulates on a bus link in an optical bus network structure in which access of the subscribers to the bus is not synchronously controlled, data collisions can occur. In order to guarantee a high data throughput on the bus, these data collisions must be avoided insofar as possible or must be quickly perceived. A circuit for identifying possible data collisions determines whether the bus is free for a subscriber wishing to transmit, and which permits collisions on the bus to be quickly identified and corresponding measures to be quickly initiated to prevent further collisions. The present invention enables a subscriber to a bus system to distinguish between a data collision and normal transmission errors. This distinction is made by concluding that a collision has occurred only when the bit error frequency is substantially higher than the probabilistically determined normal transmission error frequency.

28 Claims, 3 Drawing Figures

CIRCUIT FOR RECOGNIZING DATA COLLISIONS IN AN OPTICAL DATA BUS AND CIRCUIT FOR RECOGNIZING THE DATA-FREE STATUS OF THE BUS

BACKGROUND OF THE INVENTION

The invention relates to a circuit for recognizing data collisions in an optical data bus which occur when a subscriber in addition to a transmitting subscriber is also transmitting data. The invention further relates to a circuit for recognizing the data-free status of the bus.

Bus network structures have been gaining increasing acceptance in comparison to point-to-point connections, for the call setup of a plurality of subscribers (computers, terminals, etc.). A significant requirement for an ordered function sequence on the bus is the prevention of more than one subscriber from simultaneously transmitting data on the bus line. In synchronously functioning systems, this requirement for an ordered function sequence can be fulfilled by means of a defined allocation of time slots for individual subscribers. Asynchronous buses are more flexible, and in many applications, enable a higher data throughput. An example of an asynchronous access method is the "Carrier-sense-multiple-access scheme with collision detection" (CSMA/CD) which is applied and described in the Ethernet (See Comm. of the ACM, July 1976, Vol. 19, No. 7, pp. 395–404, incorporated herein by reference).

In the asynchronous method, the subscriber wishing to send, for example, computer data, must determine at the point in time at which it wishes to send whether data of at least one other computer is arriving at the receiver allocated to it. When no data is arriving, it assumes that the bus is free of data and thus a so-called transmission medium idle status exists. It now begins to transmit its data onto the bus. It can occur during the time in which this computer sends its data that data from at least one other computer arrives at the receiving computers. This must be perceived in the sending computers as a collision status.

SUMMARY OF THE INVENTION

An object of the invention is to specify a simple and compact circuit for recognizing data collisions in an optical data bus of the type initially cited and to provide an electronic circuit for recognizing the transmission medium idle status of an optical data bus of the type initially cited.

According to the invention, an amplitude comparator with first and second comparison inputs is provided. The first input is connected to receive data from the data bus via the subscriber to which it is allocated. The second input is connected, via a delay means, to receive data to be generated by the same subscriber when it is to transmit data onto the bus and for which transmitting subscriber a data collision must be recognized. The delay means delays the data supplied to it by a time span which ensures the data at the two comparison inputs arrives virtually simultaneously.

Alternatively, data received by a given receiving subscriber from the data bus are suppliable to a threshold element having a predetermined threshold which is crossed when the data transmitted onto the bus from the same receiving subscriber and from one or more other transmitting subscribers are superimposed.

An evaluating means is provided following the comparator or threshold element which generates a collision signal indicating a data collision when within a given short time span it is determined more than once either that two bits compared in the comparator differ from one another, or that the predetermined threshold of the threshold element has been crossed.

DESCRIPTION OF THE PREFERRED EMBODIMENTS

Figure 1:
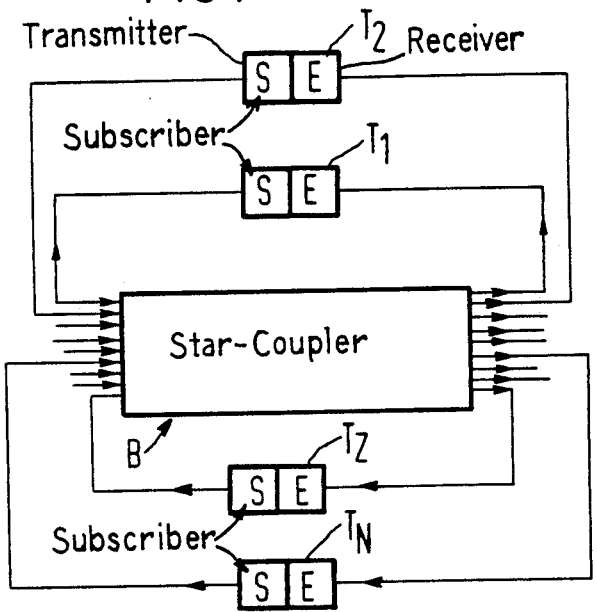
FIG. 1 schematically illustrates an optical star bus with connected subscribers.

In FIG. 1, S and E denote the transmit and receive modules of the subscribers $T_1, T_2 \ldots, T_N, \ldots T_Z, Z = 1, 2 \ldots$. The incoming light from any random transmitter S is uniformly distributed to all output fibers of the coupler over the star coupler B and thus proceeds to the receiver detectors E of all subscribers. An address preceding the data enables further processing of the information in designated selected terminals. The transmitter S of the subscriber $T_1$ may, for example, want to transmit data to the receiver E of the subscriber $T_2$. This data stream at the computer $T_2$ can be disrupted, for example, by data from the computer $T_N$. The computers $T_1$ and $T_N$ need to identify this situation. Let the two logical statuses "1" and "0" be determined in the sense of a positive logic and be optically represented, respectively, by energy packets with a power L and with a power $<< L$, for example 0.

Three statuses can be distinguished from one another:

1. "1" in the data stream;
2. "0" in the data stream; and
3. "no data stream for transmitter S (i.e., the transmitter is transmitting no data)".

In order to achieve a high data throughput, the status "no data stream" should be represented by a continuous sequence of "0" pulses. However, very long "0" statuses can also occur in the data stream. In order to distinguish the status "no data stream" from a random data stream, a scrambler SC is employed in the transmitter and a corresponding descrambler DS is employed in the receiver.

Figure 2:
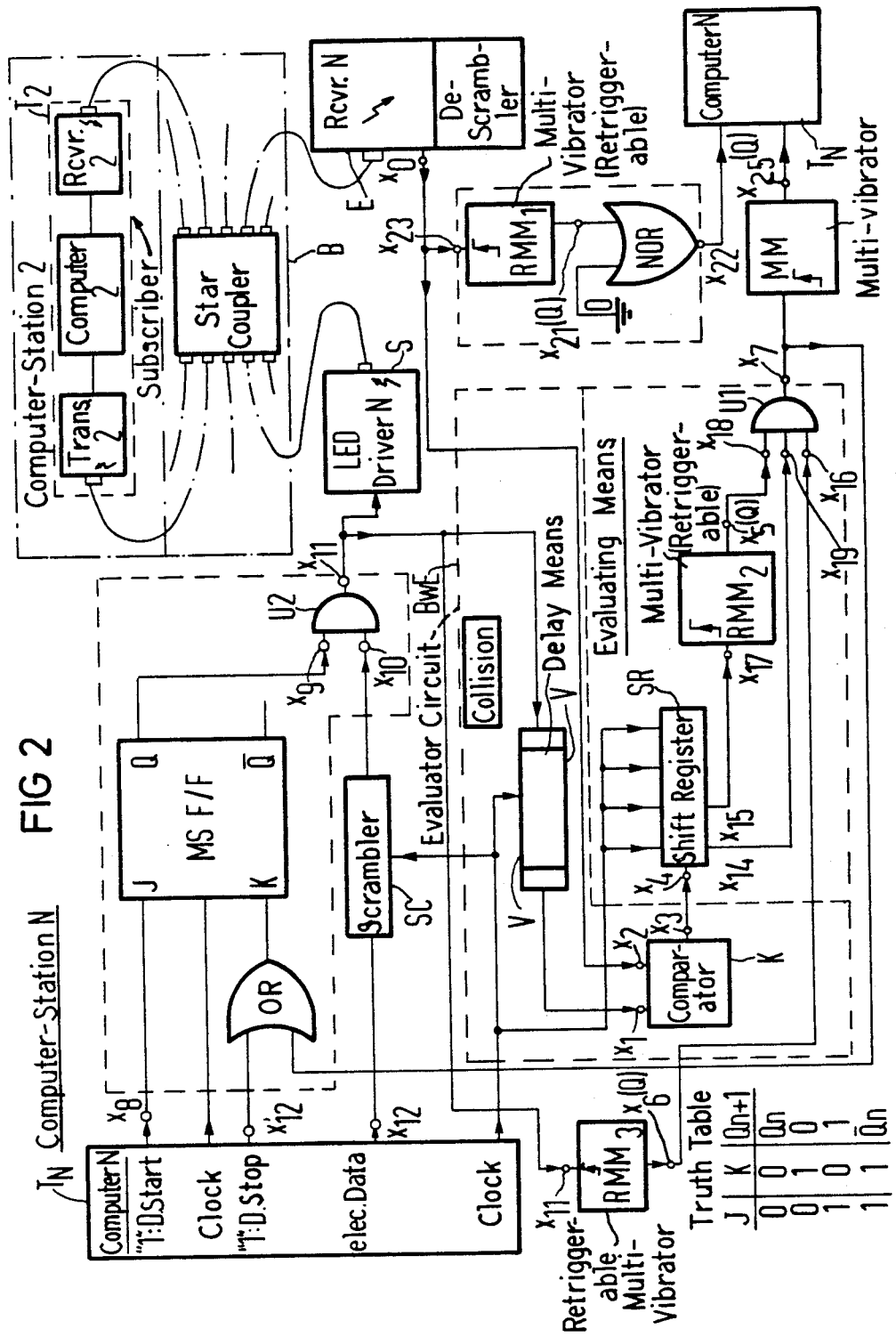
FIG. 2 illustrates a block diagram of a circuit for recognizing data collisions and the transmission medium idle status of the star bus illustrated in FIG. 1.

The circuit for recognizing collisions and the transmission medium idle status in conjunction with the transmit and receive modules, S and E, of each computer $T_N$ is illustrated in FIG. 2. Also, the optical transmission link, i.e. the bus B consisting of fibers and star coupler, as well as the terminals to the computer, are also shown. The logical functions are schematically illustrated in FIG. 2. Of course, an AND gate can also be constructed by a combination of a NAND gate with an inverter gate.

The scrambler SC has the task of generating a different bit pattern from a sequence of "0" and "1" pulses in the electrical data stream according to a specific algorithm such that it is practically impossible that the bit pattern departing the scrambler SC contains more than, for example, eight "0" or eight "1" pulses in succession. This is true even when more than eight "0" or "1" pulses occur in succession in the bit pattern incoming to the scrambler. The status "no data stream" thus exists when at least nine "0" or "1" pulses occur in uninterrupted succession at the LED driver (adhering to the example of the scrambler).

Transmission Medium Idle Recoonition

At an output $x_0$, the receiver E supplies the electrical pulses which correspond to the optical "0" and "1" pulses at the detector of the same receiver. The electrical pulses pass to a retriggerable, monostable multivibrator $RMM_1$. The output $x_{21}$, corresponding to output Q of $RMM_1$, is triggered into the unstable "1" status every time there is a transition in the input electrical pulses from "0" to "1". The time constant of the retriggerable multivibrator $RMM_1$ (holding time for a "1" at the output Q when no new transition from "0" to "1" at the input of the $RMM_1$ has occurred during this time) is to be selected such that $x_{21}$ returns to its stable "0" status, after being in its unstable "1" status, only after a continuous sequence of more than at least eight "0" pulses has been incoming to the receiver (adhering to the example of the scrambler mentioned in the last paragraph of the previous section). Hence, when data arrive at the receiver E ("1" and "0" pulses), the "1" status continuously appears at the output $x_{21}$ of $RMM_1$, and hence the "0" status continuously appears at the output $x_{22}$ of the NOR gate. When no data are incoming to the receiver E and the "transmission medium idle status" exists, the output of $RMM_1$ is at "0" and the output of the NOR gate is at "1". The computer is thus constantly informed via the two statuses whether data are appearing at the receiver E or not. Before a computer wishes to transmit data, the status $x_{22}$ is interrogated as to whether the bus B appears free for the computer.

Collision Recognition

Collisions in the above sense occur only in the case of transmitting computers, namely when data from at least one other computer is incoming to the receiver of a transmitting computer during the same time that data from the same transmitting computer is incoming to the same receiver of the same transmitting computer. This is identified in that the data of the transmitting computer—after a corresponding chronological delay—are compared bit-wise to the data arriving at the receiver of the transmitting computer. When these two bit streams coincide, then it is certain that a collision does not exist. Given deviation, however, a collision need not necessarily exist. When only one computer transmits but a transmission error occurs in its data stream, then the two data streams to be compared do likewise not coincide in all bits, although a collision does not exist in this case. Thus, it is a matter of distinguishing collisions from transmission errors. The circuit construction is based on the following perception: the probability that corresponding bits do not coincide is far higher in case of a collision than in case of a transmission error. Thus, the differentiation criterion is as follows: a collision occurs when, within a "very short time", a non-coincidence of two corresponding bits occurs more than once. "Very short time" means that this time is very short in comparison to the time during which, on the average, a transmission error can occur. Given a data rate of, for example, 20 Mbit/s and an error probability of $10^{-9}$, a transmission error occurs every 50 seconds on the average.

The significant parts of the circuit for recognizing data collisions are illustrated in FIG. 2. A "1" should only arise at the output $x_7$ of the AND gate U1 with three inputs $x_{16}$, $x_{18}$, $x_{19}$ when a collision exists. That is achieved as follows: the electrical data which drive the LED are also forwarded over a delay means V, for example a shift register, to the input $x_1$ of a comparator K for the comparison of two bits. The second input $x_2$ of the comparator is connected to the output $x_0$ of the receiver E connected to the bus B which converts the received optical signals into electrical signals, for example TTL pulses.

The delay of the electrical data which drive the LED of the transmitter S is selected such that the same statuses are present with the same phase relation at the inputs $x_1$ and $x_2$ of the comparator K whenever the data derive from the same computer. If the transit time of the pulses over the transmitter S, the bus B, and the receiver E to the input $x_2$ of the comparator K amounts to Z $\mu$s, the delay Z $\mu$s is to be selected. When the signals at the inputs $x_1$ and $x_2$ of the comparator do not coincide, this is indicated at the output $x_3$ of the comparator by a "1" (time delays in the individual logic elements or gates are not taken into consideration below).

The output signal at the output $x_3$ of the comparator K is supplied to a series input $x_4$ of a clocked shift register SR provided with parallel outputs $x_{14}$ and $x_{15}$. The parallel output $x_{14}$ is connected to a parallel input of the AND gate U1, whereas the adjacent parallel output $x_{15}$ is connected to an input $x_{17}$ of the retriggerable monostable multivibrator $RMM_2$. A "0" to "1" transition at the parallel output $x_{15}$ triggers the Q-output $x_5$ of the retriggerable monostable multivibrator $RMM_2$ into the unstable "1" status for a duration which, for example, is selected twelve bits long. When the signals at the inputs $x_1$ and $x_2$ of the comparator K deviate from one another for only one bit period during the twelve bit duration, then a transmission error exists and the signals appearing at the other parallel output $x_{14}$ and the output $x_5$ of the multivibrator $RMM_2$ cannot simultaneously be "1", whereby "0" must necessarily be at the output $x_7$ of the AND element U1. When, in contrast thereto, a "1" appears more than once at the output $x_3$ of the comparator K, and thus at the series input $x_4$ of the shift register SR during the 12-bit duration, then a collision exists and a "1" appears simultaneously at the outputs $x_{14}$ and $x_5$ at least once during this time. Thus, collisions can be discriminated from transmission errors based on the statuses at the outputs $x_5$ and $x_{14}$.

The shift registers V and SR are controlled by the same clock which also controls the electrical data from the computer (clock from the computer). Suitable phase shifts of the clock pulses for the shift registers are selected. For example, the pulses at the series input $x_4$ of the shift register SR are interrogated as to their status at the pulse center. Fluctuations in the clock frequency given collision-free transmission are non-disruptive since this equally influences the bit streams supplied to the inputs $x_1$ and $x_2$ of the comparator K.

Over an input $x_{11}$, a further retriggerable, monostable multivibrator $RMM_3$ receives the same bit pattern as the LED driver in the transmitter S. The multivibrator $RMM_3$ generates a "1" sequence at its Q-output $x_6$ when a "1" is applied to the input $x_{11}$. The time constant of the multivibrator $RMM_3$ is selected such that, given a "0" to "1" transition at the input $x_{11}$, the output $x_6$ remains at "1" for a time equal to the sum of the time duration of 12 bits, for example, plus the transit time of a pulse through the path formed by the LED driver, the bus B, and the receiver E up to the input $x_2$ of the comparator K. When the computer transmits data, then the output $x_6$ of the monostable multivibrator $RMM_3$ connected to the third input $x_{16}$ of the AND gate U1 proceeds to "1" no later than after 12 bits relative to the beginning of the input $x_{11}$ (adhering to the example of the scrambler mentioned in the last paragraph of the previous section). Until the last transmitted bit of the computer has arrived at the same computer, the AND gate U1 remains so to speak "open" due to the "1" at its third input $x_{16}$, and supplies at least one "1" at its output $x_7$ during this time in case of a collision, and a "0" in case of a transmission error or no collision.

The "1" pulse at the output $x_7$ of the AND gate U1 stops further data transmission in the computer given a collision. However, due to an additional monostable multivibrator MM connected to the output $x_7$ of the AND gate U1, the "1" pulse also triggers a "1" status of variable length at an output $x_{15}$ of the multivibrator MM. The length of the pulse is selected such that the computer can recognize that a collision has occurred. In the remaining computers which did not transmit, the input $x_1$ of the comparator K would have always been at "0" while data from the bus B was incoming to the input $x_2$ of the comparator K. Hence, the outputs $x_5$ of the monostable multivibrators $RMM_2$ and the parallel outputs $x_{14}$ of the shift registers SR in the remaining computers which did not transmit likewise simultaneously become "1" when data is incoming to the receivers of these computers. The fact that the transmission capability in these computers is not inhibited due to a long "1" pulse at the output $x_{25}$ of the additional monostable multivibrator MM is caused by the further monostable multivibrator $RMM_3$. In computers which are not transmitting, of course, the input $x_{11}$ of the multivibrator $RMM_3$ is at "0", and thus its output $x_6$ is also at "0" as are then the outputs $x_7$ and $x_{25}$. Thus, a "1" pulse is received at the output $x_7$ or $x_{25}$ only when the computer terminal to which it is attached is transmitting, and only then, when there is a collision.

A master-slave flip-flop MS F/F with inputs J, K and outputs $\overline{Q}$ and Q which is characterized by the truth table shown at the bottom left in FIG. 2 is also provided in the circuit according to FIG. 2. Let the initial status of the bistable flip-flop MS F/F at the beginning be such that "0" pends at the output Q. When data are to be transmitted, a "1" pulse proceeds from the computer to the input J and, in accordance with the truth table, the output Q is accordingly set to "1" and the bit sequence of the scrambler SC proceeds to the LED driver of the transmitter S. When on the other hand a collision has been perceived, the "1" pulse at the output $x_7$ of the AND gate U1 is applied via an OR gate OR to the K input of the flip-flop MS F/F. Since the input J is at "0", the output Q is set to "0". The output Q at the end of data is likewise set to "0" when the end of data is indicated by a "1" pulse at the input of the OR gate. When the output Q lies at "0", the LED driver supplies a "0" sequence, this denoting the status "no data stream" from the transmitter.

Given the circuit according to FIG. 2, the delay, V, must be sufficiently precise and chronologically stable. Given a change of the fiber length of the bus or of a module, the delay must generally be reset. The required delay increases with increasing bus length.

When the delay is realized by a clocked shift register, then the capability of the shift register increases with the bus length.

Figure 3:
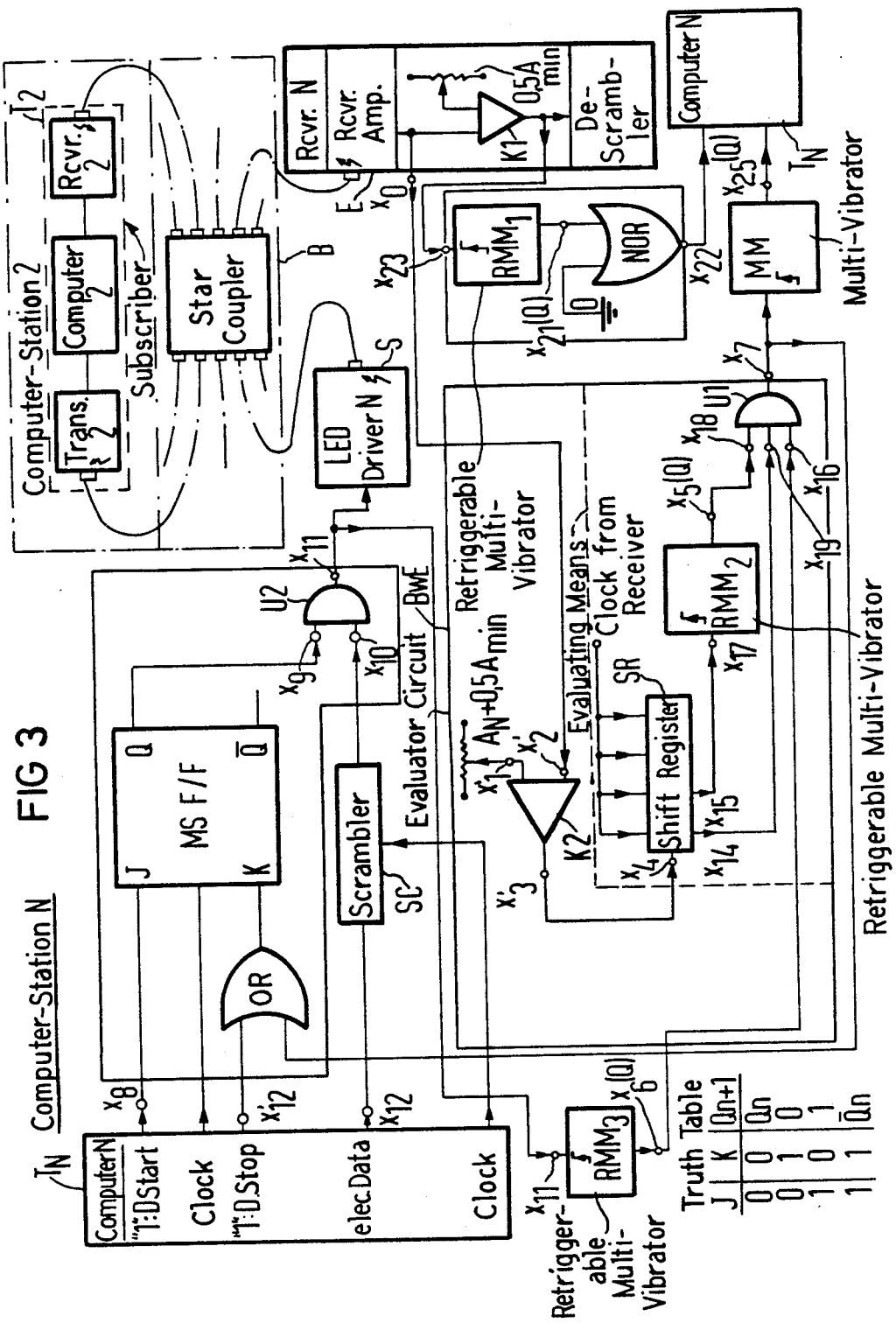
FIG. 3 shows a block diagram of a circuit for recognizing data collisions and the transmission medium idle status with a modified circuit for recognizing the data collisions.

A circuit alternative is illustrated in FIG. 3 wherein no delay is required for collision recognition. This circuit alternative differs from the circuit according to FIG. 2 by the differently constructed evaluation means BwE.

Instead of a delay means and the following TTL amplitude comparator (for example, Texas Instruments SN74586 or SN7485), the evaluator circuit BwE according to FIG. 3 requires only an analog comparator (for example, Texas Instruments SN 75107A). As in the embodiment according to FIG. 2 as well, a further analog comparator is contained in the receiver E which converts the pulses at the amplifier output of the receiver E back into rectangular TTL pulses.

The function of the two analog comparators for recognizing a collision is as follows. The electrical signal comes from the amplifier of the receiver E, its amplitude depending on the place of origin and on the plurality of optical data streams which impinge on the detector of the receiver E. In the amplifier portion (not illustrated) of the receiver E, a device may be provided by means of which the amplitude at the amplifier output cannot become greater than the admissible voltage at the input of the comparators.

The differentiation of a bit stream having a plurality of bit streams occurs with the assistance of the two comparators K1 and K2 since the two comparators function on different thresholds. The optical signal powers at the location of a receiver $E_N$ fluctuate as a function of the various subscribers $T_M$ (M−1, ... N .. . ,Z; Z=number of subscribers) due to various causes, for example variable fiber and line attenuations, non-uniform power distribution through the mixer, etc.

Let the amplitude at the amplifier output (belonging to the subscriber $T_N$) which is generated by the optical power emitted by the subscriber himself amount to $A_N$. Let the minimum amplitude detected at the output of the amplifier for only one bit stream be referenced $A_{min}$. The threshold voltage is set to approximately 0.5 $A_{min}$ at the comparator K1 and to approximately $A_N + 0.5 \cdot A_{min}$ in the comparator K2. In this way, when data transmitted only by subscriber N is incoming to the receiver of subscriber N, the received data is reconstructed into rectangular electrical pulses at the output of K1. In contrast, the output of K2 is "0". When the intrinsic bit stream from subscriber N is disrupted by bit streams from at least one other subscriber (collision), the optical powers superimpose as do the amplitudes at the output of the amplifier of subscriber $T_N$. When the amplitude at the amplifier output exceeds the threshold $A_N + 0.5 \cdot A_{min}$ of the comparator K2, the output of the comparator K2 is set to "1" thereby indicating a collision. The output of K2 could also become "1" due, for example, to noise factors when subscriber N is receiving only its own data although the signal amplitude, on average, does not exceed the threshold voltage $A_N + 0.5 \cdot A_{min}$. In order to distinguish these transmission errors from true collisions, the embodiment according to FIG. 2 is employed. The clock for the shift register SR of the evaluator circuit BwE is derived from the bit stream in the receiver E. When subscriber N is not transmitting, its collision detection circuitry is disabled since the output $x_6$ of $RMM_3$ is at "0", whereby the collision-signal-output $x_7$ of AND gate U1 is also at "0". Thus, as is also the case in the embodiment according to FIG. 2, a "1" pulse is received at $x_7$ only when the subscriber to which it is attached is transmitting, and only then, when a collision occurs.

The problem of the phase position of two or more bit streams relative to one another is yet to be mentioned. One must proceed on the basis that every phase difference between the bit streams can occur. Consequently, the amplitudes of the bit streams at the output of the amplifier can, in general, not coincide chronologically so that the threshold voltage $A_N + 0.5 \cdot A_{min}$ is possibly not crossed and no "1" is generated at the output of the comparator K2, although a collision exists. When, however, one of the bit streams contains two "1's" in succession and a "1" of the other bit stream falls in this chronological interval (the phase position no longer plays any role), a collision is perceived. Theoretically, this indeed means a longer time in general for recognition of a collision in comparison to the embodiment according to FIG. 2, but this is insignificant in practical terms. As a result of setting the thresholds at the analog comparators K1 and K2, for all practical purposes, independence is achieved from the power fluctuations at the receiver as a function of the respectively transmitting subscriber.

In conclusion, let the two embodiments according to FIGS. 2 and 3 be compared to one another.

Both embodiments employ the same circuit for recognizing the transmission medium idle status.

The embodiment according to FIG. 3 generally requires a longer time before a collision can be perceived. This time is shortened with an increasing plurality of disrupting subscribers. When only one disruptive computer exists, this disruption (collision) can be perceived no earlier than the time required by a pulse to arrive at the location from which it has been emitted.

The embodiment according to FIG. 3 is simpler than the embodiment according to FIG. 2. No delay is required for compensating the transmit time effects through the bus.

This delay, which must be chronologically stable, may possibly have to be adjusted in the embodiment according to FIG. 2 when the optical cable or a module is replaced. In the embodiment according to FIG. 3, the clock for the shift register is taken from the receiver. Strict synchronism between the clock and the data which are clocked into the shift register should exist when only one bit stream is being received.

In the sample embodiments described above, the specific transmitting subscriber is also the specific receiving subscriber at the same time. This need not be the case. The specific receiving subscriber and the specific transmitting subscriber can also differ from one another. For example, and without limiting universality, $T_N$ in FIG. 1 could be the specified, transmitting subscriber whereas one of the remaining subscribers $T_1, T_2, \ldots, T_{n-1}, T_{N+1}, \ldots, T_Z$ could be the specified receiving subscriber.

Although various minor changes and modifications might be proposed by those skilled in the art, it will be understood that we wish to include within the claims of the patent warranted hereon all such changes and modifications as reasonably come within our contribution to the art.

We claim as our invention:

1. A circuit for recognizing data collisions in an optical data bus to which a plurality of subscribers each with transmitting and receiving capability are connected, wherein a plurality of transmitting subscribers asynchronously transmit data in the form of bit sequences, a given transmitting subscriber transmitting data only after he has determined that the data bus is carrying no data, comprising:
   (a) an amplitude comparator with first and second comparison inputs, the first input being connected to receive data from the data bus via the subscriber to which it is attached, the second input being supplied with data via a delay means, said data being generated by the same subscriber and transmitted on the bus, said delay means delaying the data supplied to it by a time span which insures that the data at the two comparison inputs arrives virtually simultaneously; and
   (b) evaluating means following the comparator for generating a collision signal indicating a data collision only when within a given short time span it is determined more than once that two bits compared in the comparator differ from one another.

2. A circuit according to claim 1 wherein the given transmitting subscriber is also the given receiving subscriber at the same time.

3. A circuit according to claim 1 wherein the delay means comprises an electrical delay circuit and the comparator comprises an electrical TTL comparator.

4. A circuit according to claim 3 wherein the electrical delay circuit comprises a shift register.

5. A circuit according to claim 1 wherein the evaluating means comprises a clocked shift register with a series input and with first and second parallel outputs, the series input being connected to an output of the comparator, and the shift register being driven with the clock with which the data to be transmitted by the given transmitting subscriber are clocked.

6. A circuit according to claim 5 wherein the first parallel output of the clocked shift register lying closest to the series input is connected to an input of an AND element and the second parallel output is connected to an input of a retriggerable, monostable multivibrator so that upon transition from a specific binary status into the other binary status one output of the multivibrator is transferred into a specific binary status and remains in this status for the duration of the said given short time span.

7. A circuit according to claim 6 wherein upon transition from a binary status "0" to a binary status "1" at the input of the multivibrator, a Q output of the multivibrator is transferred into the binary status "1" for a time of a given number of bits.

8. A circuit according to claim 6 wherein a further retriggerable monostable multivibrator with an input and an output connected to an input of the AND element is provided, an input of the further multivibrator being supplyable without significant delay with the data generated by the given transmitting subscriber and which is dimensioned such that upon transition from a specific binary status into the other binary status at its input, its output is transferred into a specific binary status for a time equal to a sum of said given short time span and a transit time of data generated by the given transmitting subscriber and transmitted over the bus and the given receiving subscriber up to the comparator.

9. A circuit according to claim 8 wherein an input of an additional monostable multivibrator is connected to an output of the AND element, the output of said additional multivibrator upon transition from a specific binary status into the other binary status at the output of the AND element changing into a specific binary status for a time which is of such duration that the given transmitting subscriber stopped by a change of the specific binary status at the output of the additional multivibrator can recognize that a collision has occurred.

10. A circuit according to claim 6 wherein the output of the AND element is connected via an OR element to a K input of a J-K flip-flop whose J input is connected to an output of the given transmitting subscriber at which a change into the specific binary status at the output of the J-K flip-flop element is accomplished at the beginning of data transmission; the OR element being connected to an output of the given transmitting subscriber at which a change into the specific binary status at the output of the J-K flip-flop element is accomplished for stopping the transmitted data; and a data output of the given transmitting subscriber for the data to be transmitted and an output of the J-K flip-flop are connected to respective inputs of a second AND element whose output is connected to the bus over an electro-optical transducer.

11. A circuit according to claim 1 which recognizes the data-free status of the optical data bus, said circuit including a scrambler means between a data output of the transmitting subscriber and the data bus, the data transmitted being scrambled in said scrambler means such that bits of a binary status can occur at most n times (n=a prescribable whole number) in succession in a bit sequence which leaves the scrambler even when bits of a specific binary status occur more frequently in succession in the bit sequence incoming to the scrambler; the scrambled bit sequence received by the given receiving subscriber being supplyable to a setting input of a retriggerable monostable multivibrator which is dimensioned such that given a change into the one specific binary status at the input, the output changes for a time into the specific binary status, and wherein a time constant of the monostable multivibrator is selected such that a binary signal indicating a free status appears at the output of the multivibrator only when a continuous sequence of pulses of a specific binary status is registered in the given receiving transcriber corresponding to the status of an absent data stream.

12. A circuit according to claim 11 wherein the output of the monostable multivibrator is followed by an inverter.

13. A circuit according to claim 11 wherein the given receiving subscriber is also the given transmitting subscriber at the same time, and is connected to the output of the monostable multivibrator.

14. A circuit for recognizing data collisions in an optical data bus to which a plurality of subscribers each with transmitting and receiving capability are connected, wherein a plurality of transmitting subscribers asynchronously transmit data in the form of bit sequences, a given transmitting subscriber transmitting data only after said subscriber has determined that the data bus is carrying no data, comprising:
  (a) data received by a given receiving subscriber from the data bus are supplyable to a threshold element having a predetermined threshold which is crossed when the data transmitted onto the bus from the same receiving subscriber and from one or more other transmitting subscribers are superimposed; and
  (b) evaluating means following the threshold element generating a collision signal indicating a data collision only when within a given short time span it is determined more than once that the predetermined threshold has been crossed.

15. A circuit according to claim 14 wherein the given transmitting subscriber is also the given receiving subscriber at the same time.

16. A circuit according to claim 14 wherein the threshold element comprises an electrical threshold switch to which the data deposited on the bus are supplyable after conversion into corresponding electrical signals; and the threshold of said threshold switch is selected equal to a maximum signal amplitude generated alone by the given transmitting subscriber and supplied to the threshold switch plus half the minimum signal amplitude.

17. A circuit according to claim 16 wherein the threshold switch comprises an analog amplitude comparator having two comparison inputs, one comparison input being applied to the potential of the threshold and the other comparison input being connected to an output of a receiver of the receiving subscriber.

18. A circuit according to claim 14 wherein the evaluating means comprises a clocked shift register with a series input and with first and second parallel outputs, the series input being connected to an output of the threshold element, and the shift register being directly clocked by signals received from the given receiving subscriber.

19. A circuit according to claim 18 wherein the first parallel output of the clocked shift register lying closest to the series input is connected to an input of an AND element and the second parallel output is connected to an input of a retriggerable, monostable multivibrator so that upon transition from a specific binary status into the other binary status one output of the multivibrator is transferred into a specific binary status and remains in this status for a duration of the said given short time span.

20. A circuit according to claim 19 wherein upon transition from a binary status "0" to a binary status "1" at the input of the multivibrator, a Q output of the multivibrator is transferred into the binary status "1" for a time of a given number of bits.

21. A circuit according to claim 19 wherein a further retriggerable monostable multivibrator with an input and an output connected to an input of the AND element is provided, an input of the further multivibrator being supplyable without significant delay with the data generated by the given transmitting subscriber and which is dimensioned such that upon transition from a specific binary status into the other binary status at its input, its output is transferred into a specific binary status for a time equal to a sum of said given short time span and a transit time of data generated by the given transmitting subscriber and transmitted over the bus and the given receiving subscriber up to the threshold switch.

22. A circuit according to claim 21 wherein an input of an additional monostable multivibrator is connected to an output of the AND element, the output of said additional multivibrator upon transition from a specific binary status into the other binary status at the output of the AND element changing into a specific binary status for a time which is of such duration that the given transmitting subscriber stopped by a change of the specific binary status at the output of the additional multivibrator can recognize that a collision has occurred.

23. A circuit according to claim 19 wherein the output of the AND element is connected via an OR element to a K input of a J-K flip-flop whose J input is connected to an output of the given transmitting subscriber at which a change into the specific binary status at the output of the J-K flip-flop element is accomplished at the beginning of data transmission; the OR element being connected to an output of the given transmitting subscriber at which a change into the specific binary status at the output of the J-K flip-flop element is accomplished for stopping the transmitted data; and a data output of the given transmitting subscriber for the data to be transmitted and an output of the J-K flip-flop are connected to the respective inputs of a second AND element whose output is connected to the bus over an electro-optical transducer.

24. A circuit according to claim 14 which recognizes the data-free status of the optical data bus, said circuit including a scrambler means between a data output of the transmitting subscriber and the data bus, the data transmitted being scrambled in said scrambler means such that bits of a binary status can occur at most n times (n=a prescribable whole number) in succession in the bit sequence which leaves the scrambler even when bits of a specific binary status occur more frequently in succession in the bit sequence incoming to the scrambler; the scrambled bit sequence received by the given receiving subscriber being supplyable to a setting input of a retriggerable monostable multivibrator which is dimensioned such that given a change into the one specific binary status at the input, the output changes for a time into the specific binary status, and wherein a time constant of the monostable multivibrator is selected such that a binary signal indicating a free status appears at the output of the multivibrator only when a continuous sequence of pulses of a specific binary status is registered in the given receiving transcriber corresponding to the status of an absent data stream.

25. A circuit according to claim 24 wherein the output of the monostable multivibrator is followed by an inverter.

26. A circuit according to claim 24 wherein the scrambled bit sequence is supplied to the monostable multivibrator over a regenerating threshold element.

27. A circuit according to claim 24 wherein the given receiving subscriber is also the transmitting subscriber at the same time, and is connected to the output of the monostable multivibrator.

28. A circuit for recognizing data collisions in an optical data bus to which a plurality of subscribers each with transmitting and receiving capability are connected, a given transmitting subscriber transmitting data only after the subscriber has determined that the data bus is carrying no data from another transmitting subscriber so that no collisions will occur, comprising:
a given receiving subscriber supplying data received from the data bus to a means for determining whether data is present from another transmitting subscriber not associated with the receiving subscriber which is receiving data; and
evaluating means following the means for determining and which generates a collision signal indicating a data collision only when within a given short time span it is determined more than once that said means for determining has provided a signal output indicative of possible data collisions.

* * * * *